(12) United States Patent
Cavaliere et al.

(10) Patent No.: US 12,363,077 B2
(45) Date of Patent: Jul. 15, 2025

(54) NETWORK TRAFFIC MANAGEMENT

(71) Applicant: Telefonaktiebolaget LM Ericsson (publ), Stockholm (SE)

(72) Inventors: Fabio Cavaliere, Vecchiano (IT); Giovanni Fiaschi, Sollentuna (SE); Paolo Debenedetti, Albissola Marina (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 235 days.

(21) Appl. No.: 17/926,949

(22) PCT Filed: May 20, 2020

(86) PCT No.: PCT/EP2020/064181
§ 371 (c)(1),
(2) Date: Nov. 21, 2022

(87) PCT Pub. No.: WO2021/233543
PCT Pub. Date: Nov. 25, 2021

(65) Prior Publication Data
US 2023/0208818 A1    Jun. 29, 2023

(51) Int. Cl.
*H04L 9/40*  (2022.01)
*G06F 21/62*  (2013.01)
(Continued)

(52) U.S. Cl.
CPC ...... *H04L 63/0421* (2013.01); *G06F 21/6245* (2013.01); *H04L 47/22* (2013.01);
(Continued)

(58) Field of Classification Search
CPC ... H04L 63/0421; H04L 47/22; H04L 63/162; H04L 63/18; H04L 69/322; H04L 63/0428; H04L 63/164; G06F 21/6245
See application file for complete search history.

(56) References Cited

U.S. PATENT DOCUMENTS

2005/0249144 A1\* 11/2005 Saha .................. H04B 7/18539
370/316
2008/0192925 A1\* 8/2008 Sachs .................. H04W 12/033
380/29
(Continued)

FOREIGN PATENT DOCUMENTS

EP        3547637 A1    10/2019
WO    WO-2018086713 A1 \*  5/2018    ......... H04L 43/0852

OTHER PUBLICATIONS

IEEE, "IEEE Standard for Local and metropolitan area networks—Media Access Control (MAC) Secutiry", IEEE Computer Society, Dec. 26, 2018, pp. 1-239.

*Primary Examiner* — Brian J. Gillis
*Assistant Examiner* — Chhian (Amy) Ling
(74) *Attorney, Agent, or Firm* — Weisberg, I.P. Law, P.A.

(57) ABSTRACT

There is provided a method comprising: detecting (310) a subset of protocol data units in an original stream of protocol data units to be transmitted over the network, wherein the original stream is associated with a first source port; generating (320) an updated transmitting-side stream of protocol data units based on the original stream, wherein the updated transmitting-side stream excludes the detected subset; merging (330) the subset of protocol data units with a subset of protocol data units associated with a second source port to form a merged stream; transmitting (340) the merged stream, as a first stream, over a first link of the network; transmitting (350) the updated transmitting-side stream associated with the first source port, as a second stream, over a second link; and transmitting (360) an updated transmitting-side stream associated with the second source port, as a third stream, over a third link.

17 Claims, 9 Drawing Sheets

(51) Int. Cl.
*H04L 47/22* (2022.01)
*H04L 69/322* (2022.01)

(52) U.S. Cl.
CPC ........ *H04L 63/0428* (2013.01); *H04L 63/162* (2013.01); *H04L 63/18* (2013.01); *H04L 69/322* (2013.01)

(56) References Cited

U.S. PATENT DOCUMENTS

| | | | |
|---|---|---|---|
| 2010/0070588 A1* | 3/2010 | Sinn | H04L 51/04 709/206 |
| 2014/0090011 A1* | 3/2014 | Howe | H04L 47/2416 726/1 |
| 2016/0134595 A1 | 5/2016 | Lavinio | |
| 2017/0201352 A1* | 7/2017 | Hessler | H04L 1/0082 |
| 2021/0105777 A1* | 4/2021 | Loehr | H04W 72/0466 |

* cited by examiner

NETWORK TRAFFIC MANAGEMENT

PRIORITY CLAIM

This application is a national stage application of International Patent Application No. PCT/EP2020/064181, filed May 20, 2020, the disclosure disclosures of which is hereby incorporated in its entirety by reference.

TECHNICAL FIELD

The present disclosure relates to the field of network traffic management, specifically methods and apparatuses for managing traffic flow over networks. In particular, the present disclosure relates to the field of network traffic management pertaining to security and encryption protocols including Media Access Control Security (MACsec) and Internet Protocol Security (IPsec).

BACKGROUND 5G transport networks may require processing functionalities that are particularly resource-consuming, such as security and encryption protocols like Internet Protocol Security (IPsec) and Media Access Control Security (MACsec). These functionalities are only required for a small portion of the traffic, like sensitive user information or management and control protocols, while most of the data plane traffic does not require additional transport security mechanisms. For example, they may already be protected end-to-end, or transmitted over the air interface.

At the same time, in order not to interfere with overlay network applications, this subset of protected traffic may need to be delivered aligned and synchronized with the unprotected traffic in the underlay network. Any change of packet order would interfere with the client application and would require further processing in the overlay network, complicating the design of the transport nodes.

Some currently known standards already consider this aspect. For example, the MACsec standard introduces the concept of unsecure service over uncontrolled port and secure service over controlled port, combined physically over the same common egress port. With this methodology, the standard allows to reserve power consuming processing just to a subset of the traffic, associating secured and unsecured traffic in the same egress port with packet synchronization at the far-end port.

The standard assumes the application of this traffic split technology over point-to-point links between MACsec enabled ports, so they require dedicated hardware to be located on each involved trunk port, independently from their usage. This is a limitation that is not easily applicable to installed base networks as well as to 5G radio networks where the usage of dedicated MACsec hardware can be expensive and unjustifiable.

A solution is therefore required that addresses one or more of these problems.

Fronthaul interfaces based on packet technology are gradually replacing the traditional constsant bit rate interfaces, like Common Public Radio Interface (CPRI), due to their compatibility with the well-established Ethernet standard and the cost reduction opportunity given using commercial transceivers and switched deployed on large scale. Example of packet fronthaul links in 5G transport networks are based on the enhanced CPRI (eCPRI) and open radio access network (O-RAN) standards. Those packet interfaces have smaller bandwidth than CPRI but similar latency (about 100 μs), since the split point is internal to the Hybrid Automatic Repeat Request (HARQ) loop. In 5G deployments, the bandwidth remains quite high, in the order of 25 Gbits/s per optical link. Additionally, Precision Time Protocol (PTP) synchronization (IEEE 1588v2, G8275.1) must be supported to guarantee symmetric and deterministic delays.

Fronthaul links need to be protected against hacking, intrusion, and tapping since the end nodes are usually located in uncontrolled environments (e.g. poles, buildings, street cabinets). Protection of sensitive data is performed by means of encryption and authentication. For protecting backhaul links, the technology normally used is IPSec, allowing to build end-to-end protection up to the security gateway. However, IPSec is not applicable to packet Fronthaul links (typically point-to-point links between baseband unit (BBU) and remote radio unit (RRU)) based on Ethernet Layer 2 interfaces. At Layer 2, MACsec (IEEE 802.1AE) is adopted as the encryption and authentication method. However, the use of MACsec in fronthaul links may increase the latency and have an impact on the complexity of the physical layer (PHY) interface and the performance of the synchronization protocols.

SUMMARY

One aspect of the present disclosure provides a method at a transmitting unit for managing traffic flow over a network, the method comprising: detecting a subset of protocol data units in an original stream of protocol data units to be transmitted over the network, wherein the original stream is associated with a first source port, and wherein the subset of protocol data units comprises one or more protocol data units that require a different amount of processing power compared to other protocol data units in the original stream; generating an updated transmitting-side stream of protocol data units based on the original stream, wherein the updated transmitting-side stream of protocol data units excludes the detected subset; merging the subset of protocol data units with a subset of protocol data units associated with a second source port to form a merged stream; transmitting the merged stream, as a first stream, over a first link of the network; transmitting the updated transmitting-side stream associated with the first source port, as a second stream, over a second link of the network; and transmitting an updated transmitting-side stream associated with the second source port, as a third stream, over a third link of the network.

Another aspect of the present disclosure provides a method at a receiving unit for managing traffic flow over a network, the method comprising: receiving a first stream of protocol data units over a first link of the network, wherein the first stream of protocol data units comprises a merged stream including a subset of protocol data units associated with a first source port and a subset of protocol data units associated with a second source port, wherein each subset of protocol data units comprises one or more protocol data units that require a different amount of processing power compared to other protocol data units in a respective original stream, and wherein a subset of protocol data units is a subset of the respective original stream; receiving a second stream of protocol data units over a second link of the network, wherein the second stream of protocol data units comprises protocol data units in the original stream of protocol data units associated with the first source port excluding the respective subset of protocol data units; receiving a third stream of protocol data units over a third link of the network, wherein the third stream of protocol data units comprises protocol data units in the original stream of protocol data unit associated with the second source port excluding the respective subset of protocol data units; generating an updated receiving-side stream of protocol data units associated with the first source port by combining the subset of protocol data units associated with the first source port and the second stream of protocol data units; and generating an updated receiving-side stream of protocol data units associated with the second source port by combining the subset of protocol data units associated with the second source port and of the third stream of protocol data units Another aspect of the present disclosure provides a transmitting unit for managing traffic flow over a network, the transmitting unit comprising processing circuitry and interface circuitry, wherein the processing circuitry is configured to: detect a subset of protocol data units in an original stream of protocol data units to be transmitted over the network, wherein the original stream is associated with a first source port, and wherein the subset of protocol data units comprises one or more protocol data units that require a different amount of processing power compared to other protocol data units in the original stream; generate an updated transmitting-side stream of protocol data units based on the original stream, wherein the updated transmitting-side stream of protocol data units excludes the detected subset; and merge the subset of protocol data units with a subset of protocol data units associated with a second source port to form a merged stream, wherein the interface circuitry is coupled to the processing circuitry and is configured to: transmit the merged stream, as a first stream, over a first link of the network; and transmit the updated transmitting-side stream associated with the first source port, as a second stream; and transmit an updated transmitting-side stream associated with the second source port, as a third stream, over a third link of the network.

Another aspect of the present disclosure provides a receiving unit for managing traffic flow over a network, the receiving unit comprising interface circuitry and processing circuitry, wherein the interface circuitry is configured to: receive a first stream of protocol data units over a first link of the network, wherein the first stream of protocol data units comprises merged stream including a subset of protocol data units associated with a first source port and a subset of protocol data units associated with a second source port, wherein each subset of protocol data units comprises one or more protocol data units that require a different amount of processing power compared to other protocol data units in a respective original stream, wherein a subset of protocol data units is a subset of the respective original stream; receive a second stream of protocol data units over a second link of the network, wherein the second stream of protocol data units comprises protocol data units in the original stream of protocol data units associated with the first source port excluding the respective subset of protocol data units; and receive a third stream of protocol data units over a third link of the network, wherein the third stream of protocol data units comprises protocol data units in the original stream of protocol data unit associated with the second source port excluding the respective subset of protocol data units, and wherein the processing circuitry is coupled to the interface circuitry and is configured to: generate an updated receiving-side stream of protocol data units associated with the first source port by combining the subset of protocol data units associated with the first source port and the second stream of protocol data units; and generate an updated receiving-side stream of protocol data units associated with the second source port by combining the subset of protocol data units associated with the second source port and the third stream of protocol data.

Another aspect of the present disclosure provides a system comprising the transmitting unit and the receiving unit as described herein.

Another aspect of the present disclosure provides a method at a system comprising a transmitting unit and the receiving unit, the method comprising the method steps at the transmitting unit and the method steps at the receiving unit as described herein.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
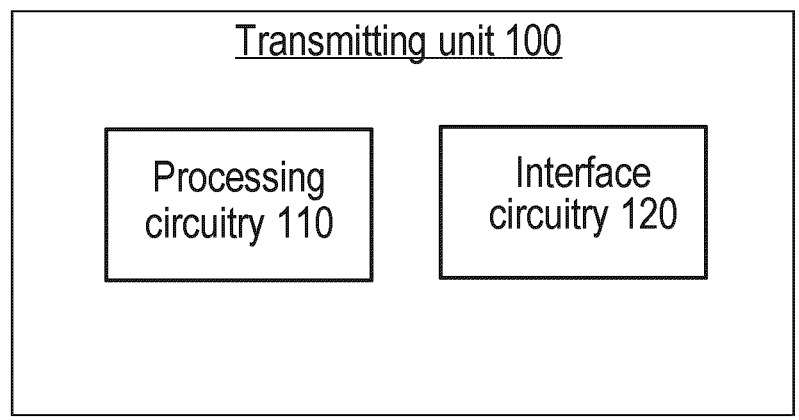
FIG. 1 is a block diagram of a transmitting unit, according to embodiments of the disclosure.

The MACsec standard describes methods for merging traffic from unsecured and secured ports over the same physical link but there are no mechanisms to secure the full synchronization of packets at the destination. This solution has major drawbacks in particular because:

It is applicable for point-to-point with MACsec chipsets on the two end points

It does not ensure packet synchronization of packets in case the unsecured traffic is significantly higher (or bigger packet length) with respect to secured traffic If the unsecured and secured traffic flows are similar, the secured flow will run slower due to encryption creating an additional latency for the overall traffic A major problem to resolve is the allocation of secured resources in advance of service deployment, designing the network always for the worst case of MACsec/IPsec requirements. In case of wrong planning or traffic burst, the network can created bottlenecks and routing limitations for the secured traffic that can impair the overlay network or create unacceptable forwarding latency.

Conversely, it is also possible that expensive MACsec/IPsec processing functions remain for quite long periods of time unused since they are dimensioned for the worst case and cannot be shared across multiple links.

Additionally, MACsec leads to some issues in packet fronthaul links since it requires more expensive PHY chipsets and makes the hardware design much more complex (more variants) in particular for Radio notes where cost and efficiency is a must to be competitive.

Most of the Fronthaul traffic does not require MACsec encryption since it is carrying RAN payload that is already protected via IPsec and upper layer RAN protocols, so that applying MACsec would add an unnecessary second encryption level.

Commercial application specific integrated circuits (ASICs), developed for mapping or carrying fronthaul interfaces over Ethernet (e.g. Broadcom Monterey), can provide MACsec encryption only on a limited number of ports, due to the high required processing power.

MACsec in up to 1 Tb/s ASICs are being introduced, but they are not applicable for distributed MAC PHY solutions. It requires a lot of additional processing compared to an ASIC that performs the same functionalities with unencrypted data.

Due to the reasons above, only a small fraction of the packet fronthaul traffic is to be protected and this is relevant to:
Control Plane traffic between BBU and RRU (non-real time)
Synchronization traffic (point-to-point boundary clock between BBU and RRU)
Management Plane traffic for the BBU to control the RRU It is estimated that for many traffic applications, this traffic type is below 5-10% of the overall throughput of the packet fronthaul link connected to be protected, a value compatible of commercial ASICs.

Embodiments described herein relates to a transparent (i.e. independent of the type of packet fronthaul interface) mechanism for splitting and recombining any packet forwarding protocol that requires high processing power, such as MACsec, IPsec, and Deep Packet Inspection, or any other processing-intensive protocols. Furthermore, embodiments described herein may also be applied to Deep Packet Inspection.

According to embodiments described herein, there is provided a way to detect security-sensitive frames without dependency from the client traffic type, as well as an effective synchronization mechanism among traffic from different sources and different processing mechanism. For example, according to some embodiments, the mechanism can split an original stream of Ethernet frames, redirecting frames containing sensitive traffic on the MACsec secured ports of the switch (usually a small subset of the total number of ports) and transmit remaining frames containing non-sensitive traffic over unsecured ports. The mechanism is energy efficient, since data is encryption only when needed and when it is compatible with commercial packet switches (which have limited processing power capabilities). Furthermore, the mechanism allows sharing of a secured link across multiple unsecured links, thereby offloading MACsec secured links from user plane traffic not requiring protection. The mechanism can operate at Layer 1 frame level only, and is independent of the user plane line rate, as the only requirement is that the secured link has enough bandwidth for the control plane and synchronization frames. The mechanism is also fully transparent with respect to Radio Access Network (RAN) protocols, since the mechanism ensures exactly the same frame sequencing at the destination. In addition, the cost of hardware is lowered since the need for MACsec PHY components is reduced.

According to some embodiments described herein, the mechanism may also involve providing for recombining of the sensitive and non-sensitive frames when at their common destination. For example, by numbering the Ethernet frames so that the original sequence of the frames can be recovered when recombining the two kinds of frames at the destination. Any introduction of additional jitter can be minimized by replacing the secured frame with placeholder frames, using the same clock reference of the original signal. Thus, embodiments described herein provide a solution applicable for computationally expensive functions, such as MACsec or IPsec traffic protection, as well as Deep Packet Inspection, in a more efficient way. Embodiments described herein may be envisaged in the fronthaul network, as will be described in more detail below.

FIG. 1 is a block diagram of a transmitting unit, according to embodiments of the disclosure. Specifically, the transmitting unit 100 can be regarded as being configured for managing traffic flow over a network (e.g. a fronthaul network). The transmitting unit 100 in this embodiment comprises processing circuitry 110 and interface circuitry 120. The processing circuitry 110 is coupled to the interface circuitry 120.

The processing circuitry 110 is configured to detect a subset of protocol data units in an original stream of protocol data units to be transmitted over the network, the original stream being associated with a first source port. Each protocol data unit may be an Ethernet frame or an IP packet. The subset of protocol data units comprises one or more protocol data units that require a different amount of processing power compared to other protocol data units in the original stream. In some embodiments, the processing circuitry 110 may be configured to detect the subset of protocol data units by determining one or more protocol data units that contain security-sensitive content as the subset of protocol data units. For example, the processing circuitry 110 may be configured to detect the subset of protocol data units by determining one or more protocol data units that contain control data as the subset of protocol data units.

In some alternative embodiments, the processing circuitry 110 may be configured to detect the subset of protocol data units in a random manner at one or more time intervals, each of the one or more time intervals having a duration that is compatible with a bit rate supported by the a first link of the network, over which the detected subset will be transmitted (as will be explained in more detail below). In these embodiments, a random number generator (RNG) such as a quantum RNG may be used for this purpose. By detecting the subset of protocol data units in a random manner, protocol data units can be selected pseudo-randomly to be transmitted over the first link of the network in order to scramble data over a second link of the network over which the protocol data units in the detected subset are transmitted. Thus, in these embodiments the transmitting unit 100 can be used for checking user data (or real time control data in eCPRI) while preventing or reducing man-in-the-middle attacks. Furthermore, in these embodiments, the relative positions of each of the protocol data units in the detected subset may be exchanged between the transmitting unit 100 and a receiving unit (e.g. the receiving unit 200 of FIG. 2) using the first link or another dedicated link (e.g. an encrypted link). In order to ensure the maximum level of security, Quantum key distribution (QKD) may be used for the first link or the dedicated link.

Subsequently, the processing circuitry 110 is configured to generate an updated transmitting-side stream of protocol data units based on the original stream. The updated transmitting-side stream of protocol data units excludes the detected subset.

In some embodiments, the processing circuitry 110 may be further configured to assign a label to each protocol data unit in the original stream of protocol data. In these embodiments, generating the updated transmitting-side stream may comprise replacing each of the detected subset of protocol data units in the original stream with a placeholder protocol data unit. Each placeholder protocol data unit contains information associated with the assigned label of the respectively replaced protocol data unit.

In some embodiments, each placeholder protocol data unit may include one or more attributes of a respectively replaced protocol data unit in the original stream, the one or more attributes a protocol data unit comprising at least one of: a size of the respective protocol data unit, head information of the respective protocol data unit, and non-security-sensitive content in the respective protocol data unit. Also, in some of these embodiments, each placeholder protocol data unit may include at least non-security-sensitive content in the respectively replaced protocol data unit in the original stream, and the processing circuitry 110 may be further configured to replace security-sensitive content in each of the placeholder protocol data unit with placeholder data.

In some embodiments, the processing circuitry 110 may be configured to store each of the assigned labels for the protocol data units in the original stream in a payload of the respective protocol data unit, so as to avoid changing a standard header.

Furthermore, the processing circuitry 110 is configured to merge the subset of protocol data units with a subset of protocol data units associated with a second source port to form a merged stream.

In the context of the disclosure, a label is indicative of an order of the respective protocol data unit in a transmission sequence. For example, an assigned label to each protocol data unit in the original stream may comprise a number indicative of the order of the respective protocol unit in the transmission sequence. Also, in some embodiments, the processing circuitry 110 may be configured to assign a label to each protocol data unit in the original stream in a cyclical manner. Furthermore, in some embodiments, the assigned label of each protocol data unit in the original stream may further contain information associated with the source port of the respective protocol data unit.

The interface circuitry 120 is configured to transmit the merged stream, as a first stream, over a first link of the network, to transmit the updated transmitting-side stream of protocol data units associated with the first source port, as a second stream, over a second link of the network, and to transmit an updated transmitting-side stream associated with the second source port, as a third stream, over a third link of the network.

It will be appreciated that the updated transmitting-side stream associated with the second source port may be generated in the similar manner as described with reference to the updated transmitting-side stream associated with the first source port. In other words, the updated transmitting-side stream associated with the second source port may be generated by replacing each of the detected subset of protocol data units in an original stream associated with the second source port with a placeholder protocol data unit. Similarly, each placeholder protocol data unit contains information associated with the assigned label of the respectively replaced protocol data unit.

In some embodiments, the interface circuitry 120 may be configured to transmit the first stream, the second stream, and the third stream to a receiving unit (e.g. the receiving unit 200 as will be described in more detail below with reference to FIG. 2). The first link may be a secured link, the second link may be an unsecured link, and the third link may be an unsecured link. Furthermore, the first link, the second link, and the third link of the network may be Media Access Control Security (MACsec) enabled or Internet Protocol Security (IPsec) enabled. Alternatively, the first link, the second link, and the third link may be enabled for Deep Packet Inspection.

It will be appreciated that FIG. 1 only shows the components required to illustrate an aspect of the transmitting unit 100 and, in a practical implementation, the transmitting unit 100 may comprise alternative or additional components to those shown.

Figure 2:
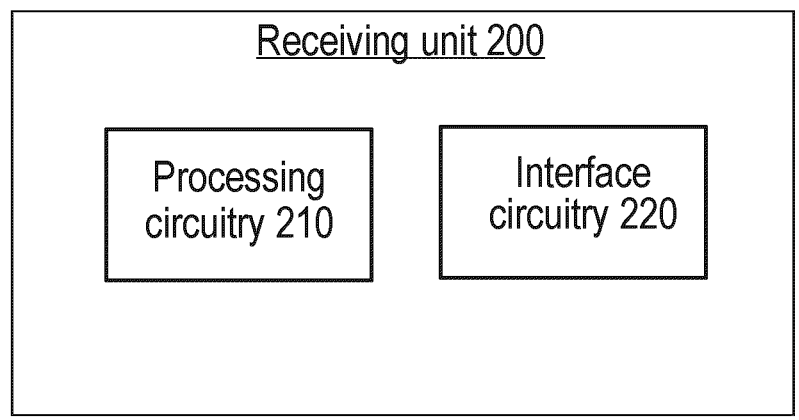
FIG. 2 is a block diagram of a receiving unit, according to embodiments of the disclosure.

FIG. 2 is a block diagram of a receiving unit, according to embodiments of the disclosure. Specifically, the receiving unit 200 can be regarded as being configured for managing traffic flow over a network (e.g. a fronthaul network). The receiving unit 200 in this embodiment comprises processing circuitry 210 and interface circuitry 220. The processing circuitry 210 is coupled to the interface circuitry 220.

The interface circuitry 220 is configured to receive a first stream of protocol data units over a first link of the network. Specifically, the interface circuitry 220 may be configured to receive the first stream from a transmitting unit (e.g. the transmitting unit 100 as described with reference to FIG. 1). The first stream of protocol data units comprises a merged stream including a subset of protocol data units associated with a first source port and a subset of protocol data units associated with a second source port. Each subset of protocol data units comprises one or more protocol data units that require a different amount of processing power compared to other protocol data units in a respective original stream. Furthermore, a subset of protocol data units is a subset of the respective original stream.

In some embodiments, each protocol data unit in the first stream may contain security-sensitive content. For example, each protocol data unit in the first stream may contain control data.

The interface circuitry 220 is further configured to receive a second stream of protocol data units over a second link of the network. Specifically, the interface circuitry 220 may be configured to receive the second stream from a transmitting unit (e.g. the same transmitting unit from which the first stream is received). The second stream of protocol data units comprises protocol data units in the original stream of protocol data units associated with the first source port excluding the respective subset of protocol data units.

The interface 220 is further configured to receive a third stream of protocol data units over a third link of the network. Specifically, the interface circuitry 220 may be configured to receive the third stream from a transmitting unit (e.g. the same transmitting unit from which the first stream and the second stream is received). The third stream of protocol data units comprises protocol data units in the original stream of protocol data units associated with the second source port excluding the respective subset of protocol data units.

In some embodiments, the first link may be a secured link, the second link may be an unsecured link, and the third link may be an unsecured link. Furthermore, the first link, the second link, and the third link of the network may be MACsec enabled, IPsec enabled, or enabled for Deep Packet Inspection.

The processing circuitry 210 is further configured to generate an updated receiving-side stream of protocol data units associated with the first source port by combining the subset of protocol data units associated with the first source port and a subset of the second stream of protocol data units, and to generate an updated receiving-side stream of protocol associated with the second source port by combining the subset of protocol data units associated with the second source port and a subset of the third stream of protocol data units.

In more detail, in some embodiments the second stream of protocol data may correspond to the original stream of protocol data units associated with the first source port, but with the respective subset of protocol data units replaced by one or more placeholder protocol data units. Each of the one or more placeholder protocol data units may contain information associated with a respective label indicative of an order of a respectively replaced protocol data unit in a transmission sequence of the respective original stream (i.e. the original stream associated with the first source port). For example, a label may comprise a number indicative of the order of the respective protocol data unit in the transmission sequence of the respective original stream. In these embodiments, the processing circuitry 210 may be configured to combine the subset of protocol associated with the first source port and a subset of the second stream of protocol data units by detecting the one or more placeholder protocol data units in the second stream, and replacing each of the detected one or more placeholder protocol data units with a corresponding protocol data unit in the first stream of protocol data units, based on the information associated with the respective labels.

Similarly, in some embodiments the third stream of protocol data units may correspond to the original stream of protocol data units associated with the second source port, but with the respective subset of protocol data units replaced by one or more placeholder protocol data units. Each of the one or more placeholder protocol data units may contain information associated with a respective label indicative of an order of a respectively replaced protocol data unit in a transmission sequence of the respective original stream (i.e. the original stream associated with the second source port). In these embodiments, the processing circuitry 210 may be configured to combine the subset of protocol associated with the second source port and a subset of the third stream of protocol data units by detecting the one or more placeholder protocol data units in the third stream, and replacing each of the detected one or more placeholder protocol data units with a corresponding protocol data unit in the second stream of protocol data units, based on the information associated with the respective labels.

In some embodiments, each placeholder protocol data unit in the second stream and the third stream may include information associated with the source port of the respectively replaced protocol data unit. In these embodiments, the generation of the updated receiving-side stream of protocol data units associated with the first source port and the second source port may be based on the information associated with the source ports.

In some embodiments, each label may be stored in a payload of a respective protocol data unit so as to avoid changing a standard header. Moreover, in some embodiments, the respective labels may be assigned in a cyclical manner, for example prior to the reception of the respective protocol data units at the receiving unit 200.

In some embodiments, each placeholder protocol data unit may include one or more attributes of a respectively replaced protocol data unit in the respective original stream, the one or more attributes a protocol data unit comprising at least one of: a size of the respective protocol data unit, head information of the respective protocol data unit, and non-security-sensitive content in the respective protocol data unit.

In some embodiments, each protocol data unit (e.g. in the first stream, the second stream, and the third stream) may be an Ethernet frame or an IP packet.

In some embodiments, the processing circuitry 210 may be further configured to queue the protocol data units in the updated receiving-side streams towards respective target destination ports.

It will be appreciated that FIG. 2 only shows the components required to illustrate an aspect of the receiving unit 200 and, in a practical implementation, the receiving unit 200 may comprise alternative or additional components to those shown.

In some embodiments, there may be provided a system comprising the receiving unit 200 as illustrated in FIG. 2 and the transmitting unit 100 as illustrated in FIG. 1. In this system, the interface circuitry 120 of the transmitting unit 100 may be configured to interface with the interface circuitry 220 such that the first stream and the second stream of protocol data units is transmitted from the transmitting unit 100 to the receiving unit 200.

Figure 3:
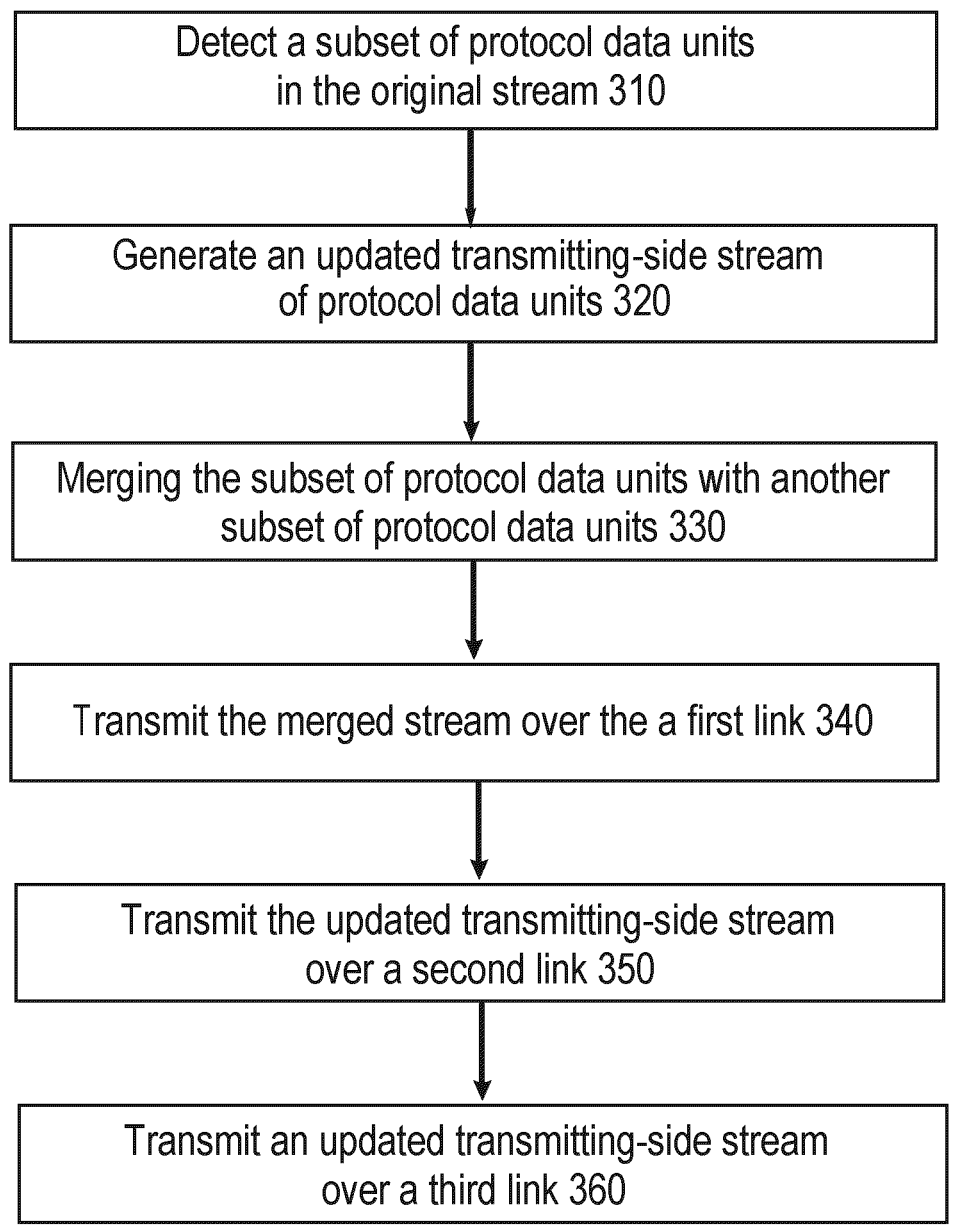
FIG. 3 is a flowchart illustrating a method at a transmitting unit, according to embodiments of the disclosure.

FIG. 3 is a flowchart illustrating a method at a transmitting unit, according to embodiments of the disclosure. Specifically, the illustrated method is for managing traffic flower over a network (e.g. a fronthaul network) at a transmitting unit, such as the transmitting unit as described with reference to FIG. 1. The illustrated method can generally be performed by or under the control of either or both of a processing circuitry and an interface circuitry, such as processing circuitry and interface circuitry of the transmitting unit 100 as described with reference to FIG. 1. In the method illustrated below, a protocol data unit may be an Ethernet frame or an IP packet.

With reference to FIG. 3, at step 310, a subset of protocol data units in the original stream of protocol data units to be transmitted over the network is detected, the original stream being associated with a first source port. This subset of protocol data units comprises one or more protocol data units that require a different amount of processing power compared to other protocol data units in the original stream. For example, in the context of MACsec, the subset of protocol data units may be a subset of Ethernet frames that require MACsec encryption.

In some embodiments, detecting the subset of protocol data units at step 310 may comprise determining one or more protocol data units that contain security-sensitive content as the subset of protocol data units. For example, detecting the subset of protocol data units at step 310 may comprise determining one or more protocol data units that contain control data as the subset of protocol data units.

In some alternative embodiments, detecting the subset of protocol data units at step 310 may be performed in a random manner at one or more time intervals, each of the one or more time intervals having a duration that is compatible with a bit rate supported by a first link of the network over which a merged stream will be transmitted (as explained in the following with reference to step 340). In these embodiments, a random number generator (RNG) such as a quantum RNG may be used for this purpose. By detecting the subset of protocol data units in a random manner at one or more random time intervals, protocol data units can be selected pseudo-randomly to be transmitted over the first link of the network in order to scramble data over a second link of the network over which the protocol data units not in the subset are transmitted. Thus, in these embodiments the illustrated method can be used for checking user data (or real time control data in eCPRI) while preventing or reducing man-in-the-middle attacks. Furthermore, in these embodiments, the relative positions of each of the protocol data units in the detected subset may be exchanged between the transmitting unit 100 and a receiving unit (e.g. the receiving unit 200 of FIG. 2) using the first link or another dedicated link (e.g. an encrypted link). In order to ensure the maximum level of security, Quantum key distribution (QKD) may be used for the first link or the dedicated link.

Subsequently, at step 320, an updated transmitting-side stream of protocol data units is generated based on the original stream. The updated transmitting-side stream of protocol data units excludes the subset detected at step 310.

In some embodiments, the method may further comprise assigning a label to each protocol data unit in the original stream of protocol data units. A label is indicative of an order of the respective protocol data unit in a transmission sequence. For example, an assigned label to each protocol data unit in the original stream may comprise a number indicative of the order of the respective protocol unit in the transmission sequence. In some embodiments, assigning a label to each protocol data unit in the original stream may be performed in a cyclical manner. Furthermore, in some embodiments, the assigned label of each protocol data unit in the original stream may further contain information associated with the source port of the respective protocol data unit.

In embodiments where the method further comprise assigning a label to each protocol data unit in the original stream, generating the updated transmitting-side stream of protocol data units at step 320 may comprise replacing each of the subset of protocol data units in the original stream as detected in step 310 with a placeholder protocol data unit. Each placeholder protocol data unit may contain information associated with the assigned label of the respectively replaced protocol data unit, e.g. a number indicative of the order of the respective protocol data unit in the transmission sequence of the original stream. In some embodiments, each placeholder protocol data unit may include one or more attributes of a respectively replaced protocol data unit in the original stream. The one or more attributes a protocol data unit may comprise at least one of: a size of the respective protocol data unit, head information of the respective protocol data unit, and non-security-sensitive content in the respective protocol data unit.

At step 330, the subset of protocol data units is merged with a subset of protocol data units associated with a second source port, in order to form a merged stream of protocol data units. The subset of protocol data units associated with the second source port may be detected in a similar manner, from an original stream associated with the second source port, as described with reference to the operation at step 310 above. For example, the determination may comprise determining one or more protocol data units in the original stream associated with the second source port that contain security-sensitive content as the subset of protocol data units.

Then, at step 340, the merged stream formed at step 330 is transmitted as a first stream over a first link of the network. In some embodiments, the first stream of protocol data units may be transmitted to a receiving unit.

At step 350, the updated transmitting-side stream of protocol data units associated with the first source port generated step 320 is transmitted as a second stream over a second link of the network. Similarly, at step 360, an updated transmitting-side stream associated with the second source port is transmitted as a third stream over a third link of the network.

The updated transmitting-side stream associated with the second source port may be generated in a similar manner as described with reference to the updated transmitting-side stream associated with the first source port. In other words, the updated transmitting-side stream associated with the second source port may be generated by replacing each of the detected subset of protocol data units in an original stream associated with the second source port with a placeholder protocol data unit. Similarly, each placeholder protocol data unit contains information associated with the assigned label of the respectively replaced protocol data unit. In some embodiments, the method may further comprise the step of generating the updated transmitting-side stream associated with the second source port. This step may be performed simultaneously with step 320 as described above.

The first link may be a secured link, the second link may be an unsecured link, and the third link may be an unsecured link. Furthermore, the first link, the second link, and the third link of the network may be MACsec enabled or IPsec enabled. In some embodiments, the second stream and the third stream of protocol data units may be transmitted to a receiving unit (e.g. the receiving unit to which the first stream of protocol data unit is transmitted in step 340).

Although not illustrated in FIG. 3, in some embodiments the method may further comprise storing each of the assigned labels for the protocol data units in the original stream in a payload of the respective protocol data unit, so as to avoid changing a standard header.

In some embodiments, each placeholder protocol data unit includes at least non-security-sensitive content in the respectively replaced protocol data unit in the original stream. In these embodiments, the method may further comprises replacing security-sensitive content in each of the placeholder protocol data unit with placeholder data (e.g. replacing the data with zeroes). This replacement step may be performed before step 340 in which the merged stream is transmitted as a first stream.

It will be appreciated that although the steps in the method illustrated in FIG. 3 have been described as being performed sequentially, in some embodiments at least some of the steps in the illustrated method may be performed in a different order, and/or at least some of the steps in the illustrated method may be performed simultaneously. For example, in some embodiments, steps 340, 350 and 360 may be performed simultaneously such that the first stream, the second stream, and the third stream are transmitted at the same time.

Any appropriate steps, methods, or functions may be performed through a computer program product that may, for example, be executed by the components and equipment illustrated in the figure above. For example, there may be provided a storage or a memory at the transmitting unit 100 that may comprise non-transitory computer readable means on which a computer program can be stored. The computer program may include instructions which cause the processing circuitry 110 and the interface circuitry 120 (and any operatively coupled entities and devices) to execute methods according to embodiments described herein. The computer program and/or computer program product may thus provide means for performing any steps herein disclosed.

Figure 4:
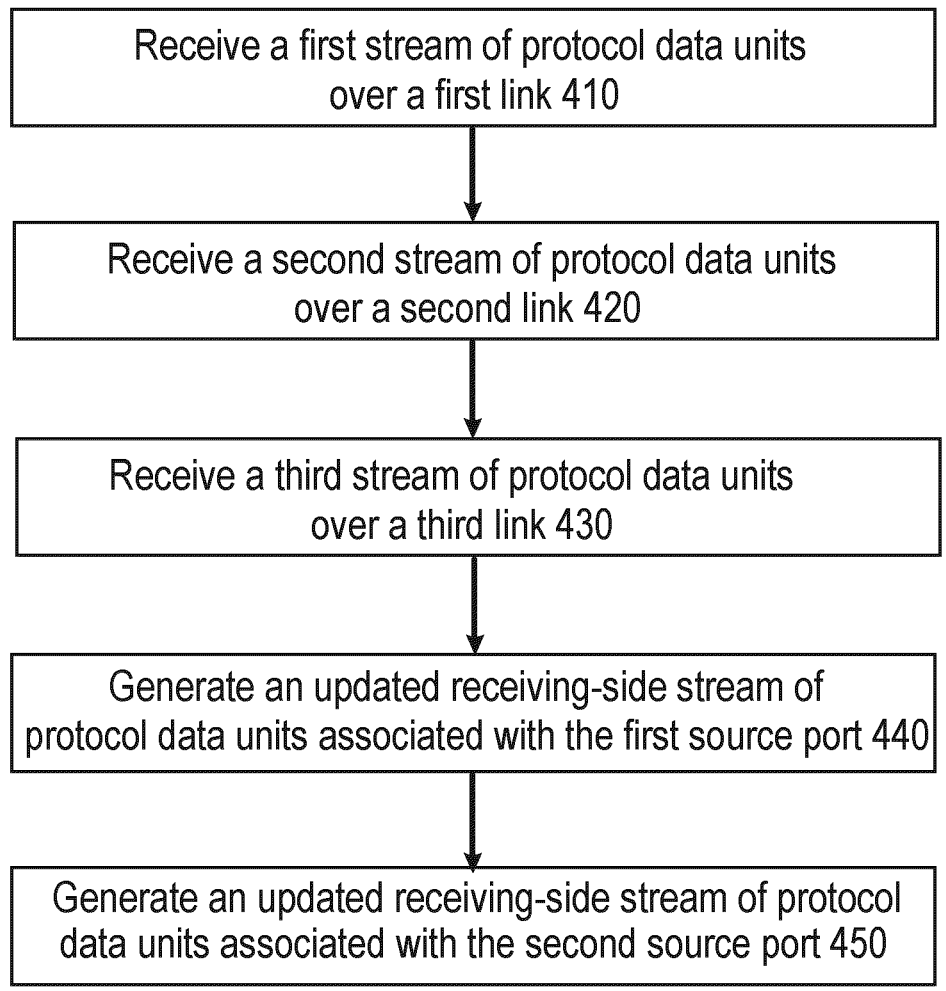
FIG. 4 is a flowchart illustrating a method at a receiving unit, according to embodiments of the disclosure.

FIG. 4 is a flowchart illustrating a method at a receiving unit, according to embodiments of the disclosure. Specifically, the illustrated method is for managing traffic flower over a network (e.g. a fronthaul network) at a receiving unit, such as the receiving unit as described with reference to FIG. 2. The illustrated method can generally be performed by or under the control of either or both of a processing circuitry and an interface circuitry, such as processing circuitry and interface circuitry of the receiving unit 200 as described with reference to FIG. 2. In the method illustrated below, a protocol data unit may be an Ethernet frame or an IP packet.

With reference to FIG. 4, at step 410, a first stream of protocol data units is received over a first link of the network. Specifically, the first stream may be received from a transmitting unit (e.g. the transmitting unit 110 of FIG. 1). The first stream of protocol data units comprises a merged stream including a subset of protocol data units associated with a first source port and a subset of protocol data units associated with a second source port. Each subset of protocol data units comprises one or more protocol data units that require a different amount of processing power compared to other protocol data units in a respective original stream. It is noted that the subset of protocol data units is a subset of the respective original stream.

In some embodiments, each protocol data unit in the first stream may contain security-sensitive content. For example, each protocol data unit in the first stream may comprise control data.

Returning to FIG. 4, at step 420, a second stream of protocol data units is received over a second link of the network. Specifically, the second stream may be received from a transmitting unit (e.g. the same transmitting unit from which the first stream is received). The second stream of protocol data units comprises protocol data units in the original stream of protocol data units associated with the first source port, but excluding the respective subset of protocol data units.

At step 430, a third stream of protocol data units is received over a third link of the network. Specifically, the second stream may be received from a transmitting unit (e.g. the same transmitting unit from which the first stream is received). The third stream comprises protocol data units in the original stream of protocol data units associated with the second source port, but excluding the respective subset of protocol data units.

In some embodiments, the first link may be a secured link, the second link may be an unsecured link, and the third link may be an unsecured link. Furthermore, the first link, the second link, and the third link of the network may be MACsec enabled or IPsec enabled.

Subsequently, at step 440, an updated receiving-side stream of protocol data units associated with the first source port is generated. This is achieved by combining the subset of protocol associated with the first source port and a subset of the second stream of protocol data units received at step 420.

In some embodiments, the second stream of protocol data units received at step 420 may correspond to the original stream of protocol data units associated with the first source port with the respective subset of protocol data units replaced by one or more placeholder protocol data units. Each of the one or more placeholder protocol data units may contain information associated with a respective label indicative of an order of a respectively replaced protocol data unit in a transmission sequence of the respective original stream, for example in some embodiments a label may comprise a number indicative of the order of the respective protocol data unit in the transmission sequence of the respective original stream. In these embodiments, combining the subset of protocol data units associated with the first source port and a subset of the second stream of protocol data units at step 440 may comprise detecting the one or more placeholder protocol data units in the second stream, and replacing each of the detected one or more placeholder protocol data units with a corresponding protocol data unit in the first stream of protocol data units, based on the information associated with the respective labels.

For example, as mentioned above, and each of the one or more placeholder protocol data units may contain information associated with a respective label indicative of an order of a respectively replaced placeholder in a transmission sequence of the respective original stream, e.g. a label comprising a number indicative of the order of the respective protocol data unit in the transmission sequence of the original stream. The replacement in this case may be based on matching the number in the information associated with a label of a placeholder protocol data unit with the number indicative an order in a transmission sequence of the respective original stream of a protocol data unit in the second stream. The respective labels may be assigned, for example at the transmitting unit before transmission of the protocol data units to the receiving unit, in a cyclical manner. Each label may be stored in a payload of a respective protocol data unit, so as to avoid changing a standard header.

Then, at step 450, an updated receiving-side stream of protocol data units associated with the second source port is generated. This is achieved by combining a subset of protocol data units associated with the second source port and a subset of the third stream of protocol data units received at step 430.

In some embodiments, the third stream of protocol data units received at step 430 may correspond to the original stream of protocol data units associated with the second source port with the respective subset of protocol data units replaced by one or more placeholder protocol data units. Each of the one or more placeholder protocol data units may contain information associated with a respective label indicative of an order of a respectively replaced protocol data unit in a transmission sequence of the respective original stream. In these embodiments, combining the subset of protocol data units associated with the second source port and a subset of the third stream of protocol data units at step 450 may comprise detecting the one or more placeholder protocol data units in the third stream, and replacing each of the detected one or more placeholder protocol data units with a corresponding protocol data unit in the first stream of protocol data units, based on the information associated with the respective labels.

In some embodiments, each placeholder protocol data unit in the second stream and the third stream may include information associated with the source port of the respectively replaced protocol data unit, wherein the generation of the updated receiving-side stream of protocol data units associated with the first source port and the second source port is based on the information associated with the source ports.

In some embodiments, each placeholder protocol data unit may include one or more attributes of a respectively replaced protocol data unit in the respective original stream. The one or more attributes of a protocol data unit may comprise at least one of: a size of the respective protocol data unit, head information of the respective protocol data unit, and non-security-sensitive content in the respective protocol data unit. The one or more attributes may also include other typical features or properties of protocol data units not mentioned here.

Although not illustrated in FIG. 4, in some embodiments the method may further comprise queuing the protocol data units in the updated receiving-side stream towards respective target destination ports.

In some embodiments, there may be provided a method at a system for managing traffic flow over a network. In these embodiments, the system may comprise the transmitting unit 100 as illustrated in FIG. 1 and the receiving unit 200 as illustrated in FIG. 2. In addition, in these embodiments the method may comprise steps 310 to 350 as described with reference to FIG. 3 as well as steps 410 to 440 as described with reference to FIG. 4. Steps 340 to 360 of FIG. 3 may be regarded as being equivalent to steps 410 to step 430 of FIG. 4, respectively. In embodiments where the method comprises steps at both the transmitting unit and the receiving unit, step 340 and step 410 may be regarded as a single step of transmitting, from the transmitting unit to the receiving unit, the subset of protocol data units, as a first stream over a first link of the network. Similarly, step 350 and step 420 may be regarded as a single step of transmitting, from the transmitting unit to the receiving unit, the updated-transmitting side stream of protocol data units associated with the first source port as a second stream over a second link of the network, and step 350 and step 420 may be regarded as a single step of transmitting, from the transmitting unit to the receiving unit, the updated-transmitting side stream of protocol data units associated with the second source port as a third stream over a third link of the network. Moreover, in these embodiments, the method may further comprise any optional steps or features as described with reference to FIGS. 3 and 4 above.

Any appropriate steps, methods, or functions may be performed through a computer program product that may, for example, be executed by the components and equipment illustrated in the figure above. For example, there may be provided a storage or a memory at the receiving unit 200 or the system that may comprise non-transitory computer readable means on which a computer program can be stored. The computer program may include instructions which cause the processing circuitry 210 and the interface circuitry 220 (and any operatively coupled entities and devices) to execute methods according to embodiments described herein. The computer program and/or computer program product may thus provide means for performing any steps herein disclosed.

Figure 5A:
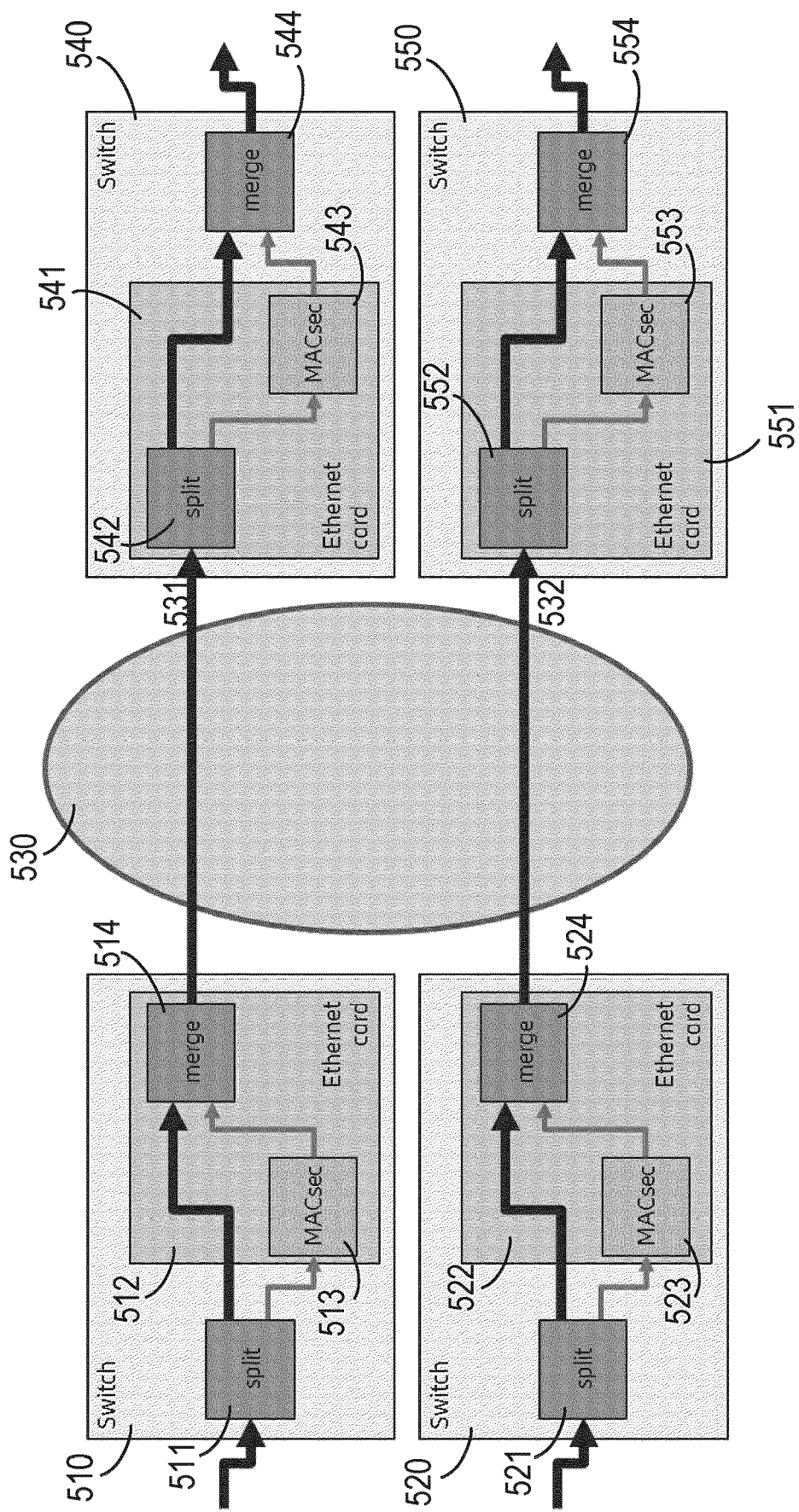
FIG. 5A and FIG. 5B are schematic diagrams illustrating the transmission of Ethernet frames in an example.
Figure 5B:
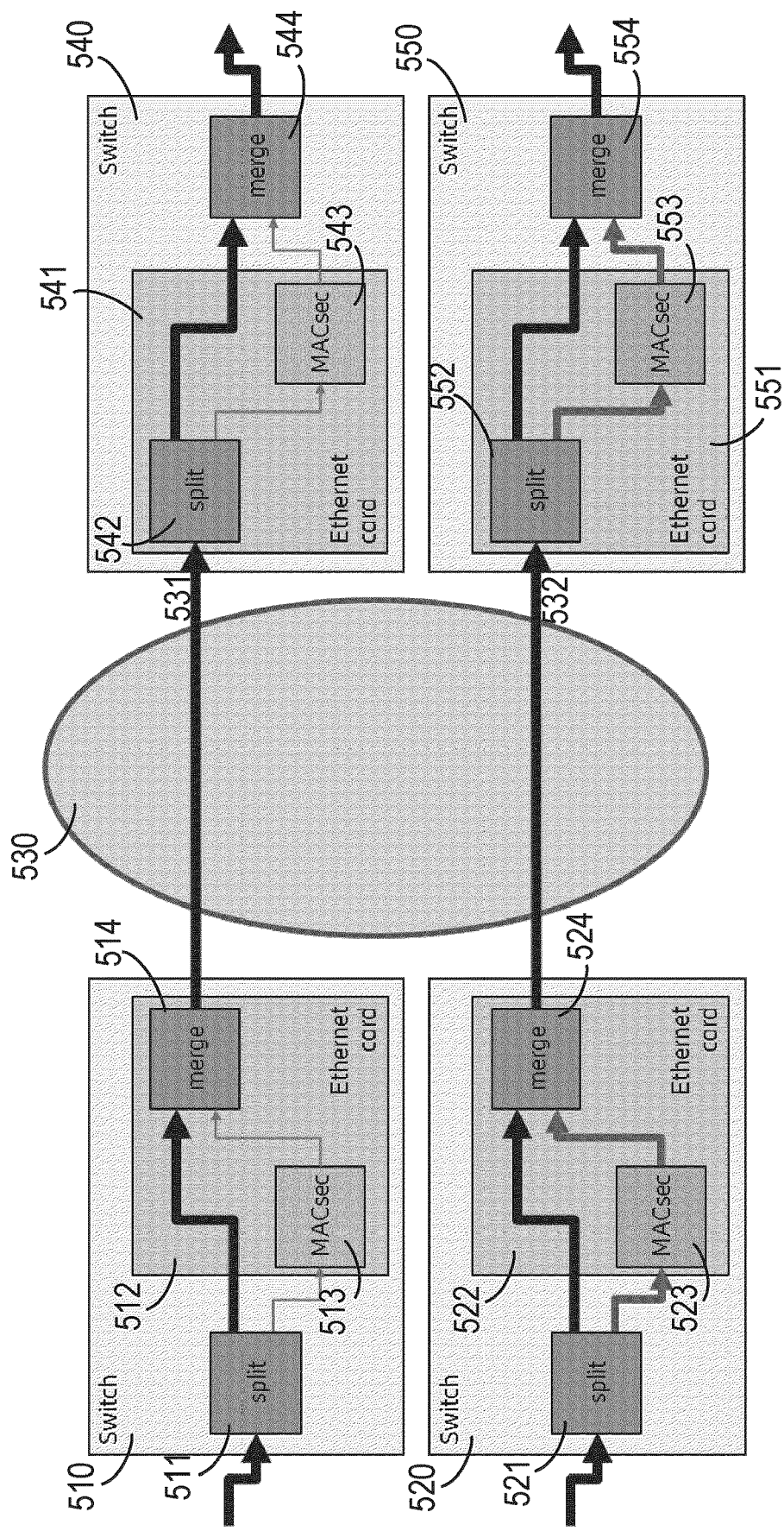

FIG. 5A and FIG. 5B are schematic diagrams illustrating the transmission of Ethernet frames in an example. This example may be regarded as an operation in the MACsec standard currently known in the art. As mentioned above, the MACsec standard introduces the concept of unsecure service over uncontrolled port and secure service over controlled port, combined physically over the same common egress port.

As shown in FIGS. 5A and 5B, there is provided a first switch 510, a second switch 520, a third switch 540, and a fourth switch 550. The first switch 510 and the second switch 520 may be regarded to be associated with a transmitting side of a network 530 in the context of this example, and the third switch 540 and the fourth switch 550 may be regarded to be associated with a receiving side of the network 530. In this example, when Ethernet frames are to be transmitted from the transmitting side to the receiving side, the Ethernet frames are transmitted from the first switch 510 to the third switch 540, and separately from the second switch 520 to the fourth switch 550. The arrows in FIG. 5A and FIG. 5B represent the direction of flow of the Ethernet frames in this example. Moreover, the relative thicknesses of the arrows are representative of the sizes of the respective flows.

In this example, at the first switch 510, a stream of Ethernet frames are first split at block 511 into two separate flows, where one flow (herein referred to as the "unsecured flow") is simply directed to the merge 514 block at an Ethernet card 512 of the first switch 510, and the other flow (herein referred to as the "secured flow") is directed to a block 513 at the Ethernet card 512 where MACsec encryption processing is applied before arriving at the merge block 514. The unsecured flow corresponds to Ethernet frames that do not require MACsec processing as they do not contain security-sensitive content, and the secured flow corresponds to Ethernet frames that require MACsec processing as they contain security-sensitive content.

Then, at the merge block 514, the two flows of Ethernet frames are recombined to be a single stream before being transmitted over a first link 530 to the third switch 540. In this example, block 513 may be regarded as a MACsec engine.

Then, at the third switch 540, the stream of incoming Ethernet frames from the first switch 510 is split into two flows at block 542, where one flow (which corresponds to the flow for which MACsec encryption processing was applied at the transmitting side, i.e. the secured flow) is directed to a block 543 where MACsec decryption processing is applied before arrive at the merge block 544, and the other flow (which corresponds to the flow for which MACsec encryption processing was not applied, i.e. the unsecured flow) is simply directed to the merge block 544. At the merge block 544, the two flows of Ethernet frames are recombined to be a single stream again before being directed to an intended destination. In this example, block 543 may be regarded as a MACsec engine.

The transmission of Ethernet frames from the second switch 520 to the fourth switch 540 is performed in a similar manner. In other words, at the second switch 520 a stream of Ethernet frames are split into separate flows (i.e. a secured flow and an unsecured flow) at block 521, where the secured flow undergoes MACsec encryption at block 523 before the two flows are recombined for transmission via a second link 532 of the network 530. At the fourth switch 550, the incoming stream is split at block 552 such that the secured flow is directed to a block 553 for MACsec decryption before the two flows are recombined at a merge block 554 to be a single stream before being directed to an intended destination. It is noted that in the arrangement as illustrated in FIG. 5A and FIG. 5B, for each of the plurality of switches a MACsec engine ("block") must be present at the Ethernet card in order for the arrangement to function properly.

In this example, FIG. 5A represents normal traffic conditions in which a typical proportion of an original stream is extracted for MACsec encryption and decryption processing. As mentioned above, the relative thicknesses of the arrows are representative of the sizes of the respective flows. In normal traffic conditions as illustrated in FIG. 5A, it can be seen that the arrows representing the flows of Ethernet frames that have to undergo MACsec processing at the first switch 510, the second switch 520, the third switch 540, and the fourth switch 550 are relatively thinner (i.e. relatively lower thicknesses) compared to those arrows representing the flows of Ethernet frames that do not have to undergo MACsec processing. In comparison, referring to FIG. 5B, it can be seen that there is a traffic burst on the secured flow of Ethernet frames at the second switch 520, and this flow can become congested at the MACsec block 523 at the second switch 520, as well as the MACsec decryption block 553 at the fourth switch 550, unless the switches were planned for worst case scenario dimensioning.

Figure 6A:
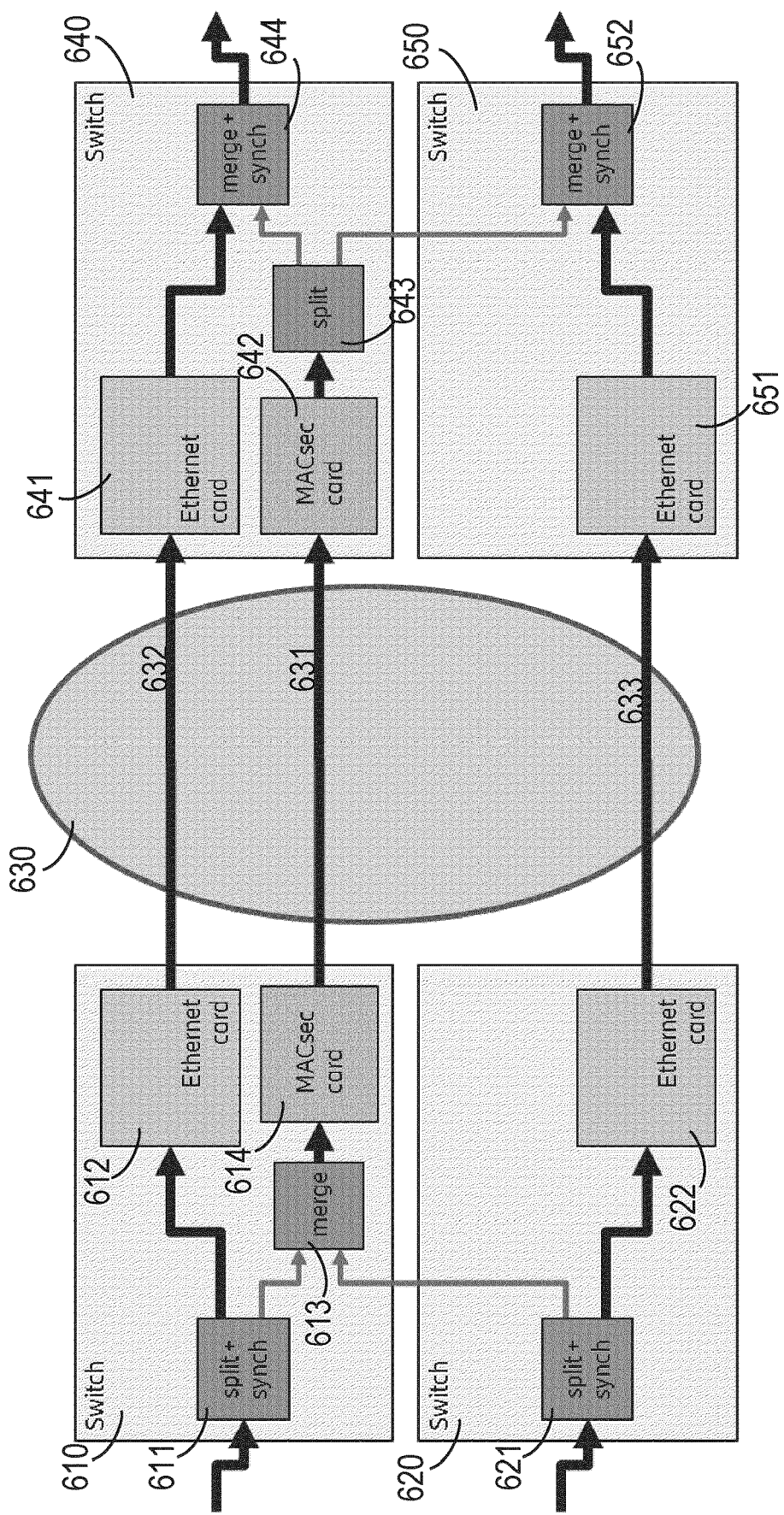
FIG. 6A and FIG. 6B are schematic diagrams illustrating the transmission of Ethernet frames, according to embodiments of the disclosure.
Figure 6B:
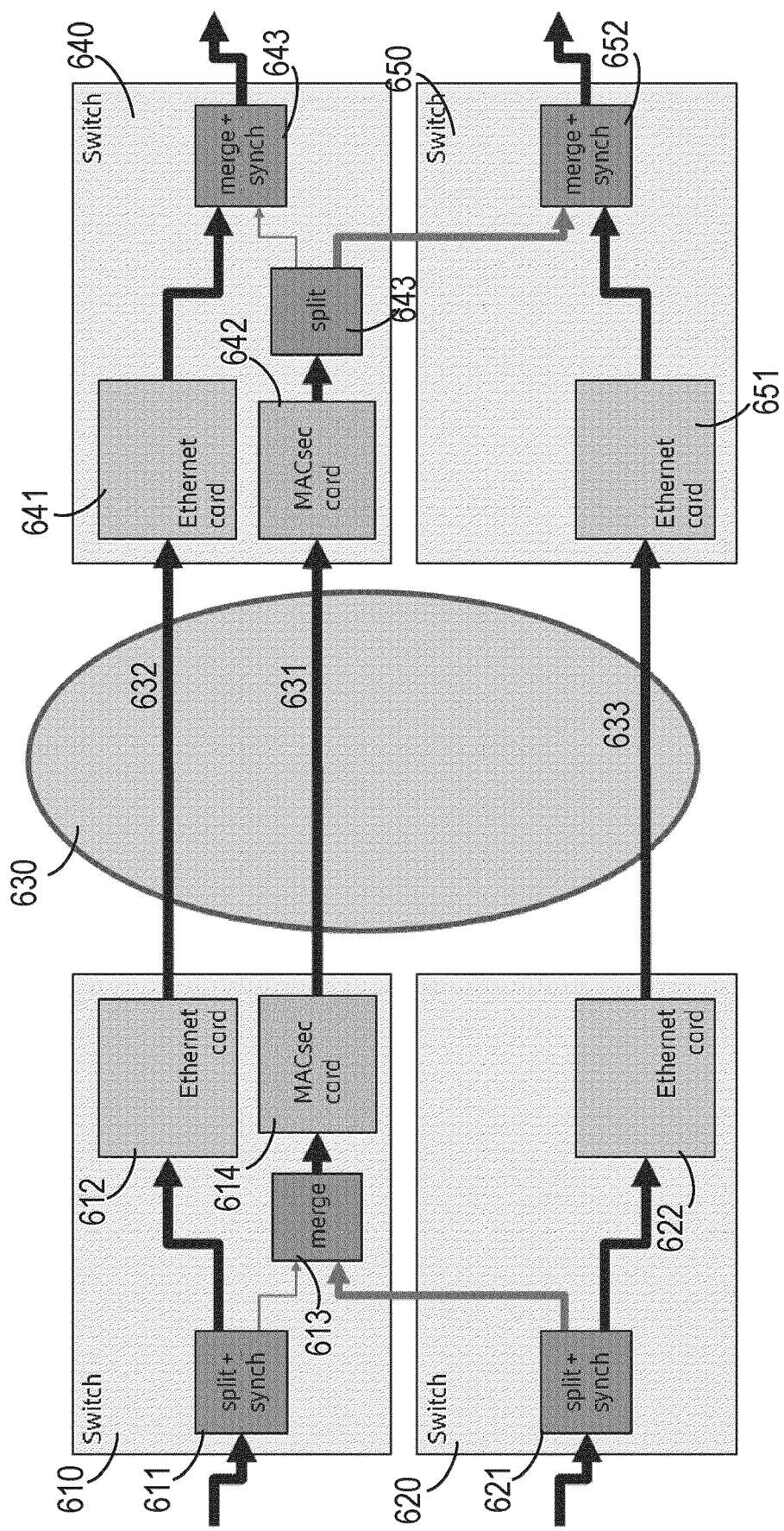

FIG. 6A and FIG. 6B are schematic diagrams illustrating the transmission of Ethernet frames, according to embodiments of the disclosure. Similar to the arrangement as described with FIG. 5A and FIG. 5B, in the arrangement according to this embodiment there is provided a first switch 610, a second switch 620, a third switch 640, and a fourth switch 650.

The first switch 610 and the second switch 620 may be regarded to be associated with a transmitting side of a network 630 in the context of this embodiment, and the third switch 640 and the fourth switch 650 may be regarded to be associated with a receiving side of the network 630. Furthermore, in the present embodiment, when Ethernet frames are to be transmitted from the transmitting side to the receiving side, the Ethernet frames are transmitted from the first switch 610 to the third switch 640, and separately from the second switch 620 to the fourth switch 650. The arrows in FIG. 6A and FIG. 6B represent the direction of flow of the Ethernet frames in this embodiment. Furthermore, similar to FIG. 5A and FIG. 5B, the relative thicknesses of the arrows in FIG. 6A and FIG. 6B are representative of the sizes of the respective flows.

In the present embodiment, at the first switch 610, a first stream of Ethernet frames is split into two separate flows and synchronized at block 611 ("split+synch"), where one flow (herein referred to as the "unsecured flow") is directed to an Ethernet card 612 of the first switch 610, while the other flow (herein referred to as the "secured flow") is directed to a merge block 613 where it will be merged with another flow from the second switch 620 before being forwarded to a MACsec card 614 at which MACsec encryption processing is applied, as will be explained in more detail below. In this embodiment, the MACsec card 614 may be regarded as a MACsec engine. The operation at block 611 may be considered to be equivalent to the method steps 310 to 330 as illustrated and described with reference to FIG. 3 above. In other words, the secured flow of Ethernet frames is a subset of the original stream Ethernet frames, the subset being detected as requiring a different amount of processing power (which, in the case, due to these Ethernet frames containing security-sensitive content). The unsecured flow of Ethernet frames corresponds to the original stream, but with the detected subset being replaced by placeholder frames. The secured flow of Ethernet frames may be detected (as the subset of the original stream) in the same way as described above with reference to FIG. 1 and FIG. 3.

At the second switch 620, in a similar manner as described with respect to the first switch 610 above, a second stream of Ethernet frames (which is separate from the first stream at the first switch 610 as described above) is split into a secured flow and an unsecured flow and synchronized at block 621. The unsecured flow at the second switch 620 is simply directed to an Ethernet card at the second switch 620, while the secured flow at the second switch 620 is directed to the merge block 613 of the first switch 610 where it is combined with the secured flow at the first switch before MACsec encryption is applied to the combined stream at the MACsec card 614. Thus, the MACsec card 614 ("MACsec engine") at the first switch 610 is configured to apply MACsec processing for the secured flow at both the first switch 610 and the second switch 620. Moreover, at the MACsec card 614 of the first switch 610 the secured flows from both the first switch 610 and the second switch 620 are combined. Hence, the MACsec processing resources is shared between the first switch 610 and the second switch 620. As such, the plurality of switches 610, 620 share a single process resource for processing intensive traffic, e.g. a MACsec card 614 for processing MACsec traffic. The second switch 620 does not have its own MACsec card. The MACsec card has been shown as present in the first switch 610, but may be present in any one of the switches or as a separate unit.

Subsequently, in the arrangement as illustrated in FIG. 6A and FIG. 6B, the secured flows from both the first switch 610 and the second switch 620, which has been combined into a single stream, are transmitted over a secured link 631 of the network 630. Also, the unsecured flows generated by the respective splitting operations at blocks 611 and 621 are respectively transmitted over the network 630 via respective unsecured links 632 and 633 of the network 630.

Then, at the third switch 640, the unsecured flow of Ethernet frames transmitted from the first switch 610 over the unsecured link 632 is received at the Ethernet card 641 of the third switch 640, while the secured flow (which is a combined stream including Ethernet frames from both the first switch 610 and the second switch 620) that is transmitted from the first switch 610 over the secured link 631 is received at a MACsec card 642 ("MACsec engine") of the third switch 640. Furthermore, the unsecured flow of Ethernet frames transmitted from the second switch 620 is received at the Ethernet card 651 of the fourth switch 650.

At the MACsec card 642 of the third switch 640, MACsec deception processing is applied to the combined stream of Ethernet frames which includes Ethernet frames of both the secured flow of the first switch 610 and the secured flow of the second switch 620. Subsequently, the combined stream is split at block 643 into two flows that correspond to respectively the secured flow of the first switch 610 and the secured flow of the second switch 620. The splitting operation at block 643 may be based on information associated with a source port of the respective Ethernet frames in the combined stream received at the block 643. The flow corresponding to the secured flow of the first switch 610 is directed towards block 644 ("merge+synch") of the third switch 640 at which it is recombined with the unsecured flow of Ethernet frames received over the unsecured link 632, before being directed to an intended destination. The operation at blocks 642 and 643 may be considered to be equivalent to the method steps 430 and 440 as illustrated and described with reference to FIG. 4 above. In other words, the placeholder frame(s) in the unsecured flow of Ethernet frames is detected and replaced by corresponding frames in the secured flow so as to generate an updated (recombined) flow of Ethernet frames. The placeholder Ethernet frames may be detected in the same way as described above with reference to FIG. 2 and FIG. 4.

Similarly, the flow corresponding to the secured flow of the second switch 620 is directed towards block 652 ("merge+synch") of the fourth switch 650 at which it is combined with the unsecured flow of Ethernet frames received over the unsecured link 633, before being directed to an intended destination. Again, the operation at block 652 may be considered to be equivalent to the method steps 430 and 440 as illustrated and described with reference to FIG. 4 above. The MACsec card 642 has been shown as present in the third switch 640, but may be present in any one of the receiving switches or as a separate unit.

In the present embodiment, FIG. 6A represents normal traffic conditions in which a typical proportion of an original stream is extracted for MACsec encryption and decryption processing at both the first switch 610 and the second switch 620. As mentioned above, the relative thicknesses of the arrows are representative of the sizes of the respective flows. In normal traffic conditions as illustrated in FIG. 6A, it can be seen that the arrows representing the flows of Ethernet frames that have to undergo MACsec processing at the first switch 610, the second switch 620, the third switch 640, and the fourth switch 650 are relatively thinner (i.e. relatively lower thicknesses) compared to those arrows representing the flows of Ethernet frames that do not have to undergo MACsec processing. In comparison, referring to FIG. 6B, it can be seen that there is a traffic burst on the secured flow of Ethernet frames at the second switch 620. Unlike in the arrangement as illustrated in FIG. 5B, in the presnet embodiment this burst in flow rate can be accommodated at the MACsec card 614 at the first switch 610 which is designed to pool Ethernet frames from more than one switches for MACsec processing.

With the arrangement proposed in the present embodiment, a more effective network traffic management can be achieved which in turns improves the efficiency of the network. A single MACsec card (or "MACsec engine") can be shared among multiple ports and nodes, which allows for pool-peak planning. The MACsec cards can be used by the most congested ports independently from their physical position which allows for significant pooling gain.

Although the present embodiment is described above in the context of MACsec protocol and Ethernet frames, it will be appreciated that the operations as described above can be similarly applied for protocol data unit transmission where a subset of an original stream of the protocol data units require a different amount of processing power.

Figure 7:
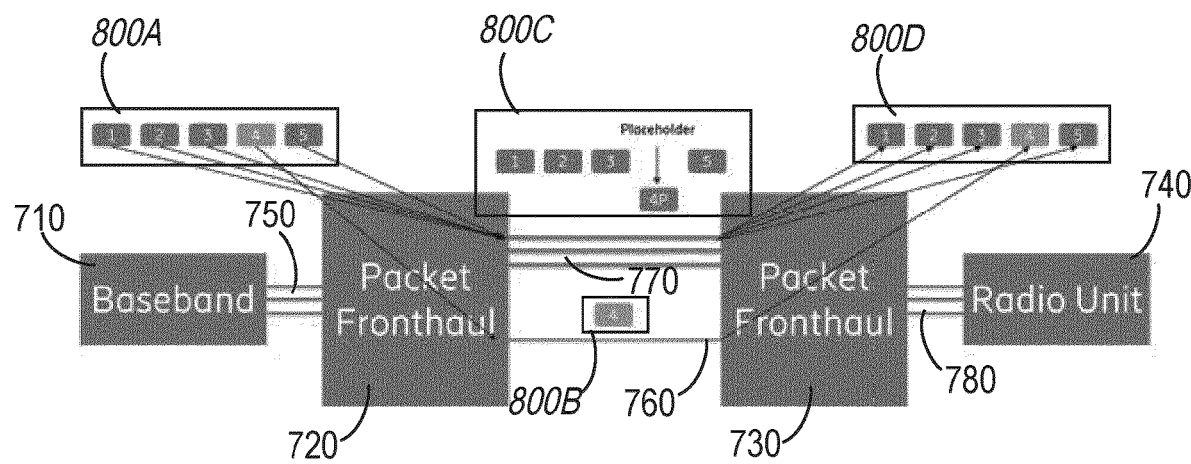
FIG. 7 is a schematic diagram illustrating replacement of a subset of protocol data units according to embodiments of the disclosure.

FIG. 7 is a schematic diagram illustrating replacement of a subset of protocol data units according to embodiments of the disclosure. For the purpose of illustration, the replacement operation will be explained with reference to a baseband unit 710, a first packet fronthaul interface 720, a second packet fronthaul interface 730, and a radio unit 740 as shown in the diagram. The baseband unit 710 is connected to the first packet fronthaul interface 720 via a first link 750. The first packet fronthaul interface 720 is connected to the second packet fronthaul interface 730 via a second link 760 and a third link 770. The second packet fronthaul interface 730 is connected to the radio unit 740 via a fourth link.

In this embodiment, the baseband unit 710 can transmit an original stream 800A of protocol data units via the first link 750 to the first packet fronthaul interface 720. As an example, as shown in FIG. 7, the original stream 800A comprises a plurality of protocol data units respectively numbered 1 to 5 based on the transmission sequence.

Then, at the first packet fronthaul, this original stream 800A of protocol data units is split into two flows. This splitting operation can be considered to be equivalent to the method steps 310 to 330 as illustrated and described above with reference to FIG. 3. In more detail, a subset of one or more protocol data units can be detected—which in this embodiment is the protocol data unit "4" in the original stream 800A. The protocol data unit "4" in this case is detected as requiring a different amount of processing power compared to other protocol data units in the original stream 800A. Subsequently, protocol data unit "4" forms a first stream 800B that is to be transmitted over the second link 760 from the first packet fronthaul interface 720 to the second packet fronthaul interface 730.

On the other hand, the detected subset in the original stream 800A is replaced by placeholder protocol data unit(s) so as to generate an updated transmitting-side stream. In this embodiment, the protocol data unit "4" is replaced by a placeholder protocol unit "4P" so as to form the updated transmitting-side stream, which is to be transmitted as a second stream 800C over the third link 770 from the first packet fronthaul interface 720 to the second packet fronthaul interface 730.

Once the first stream 800B and the second stream 800C of protocol data units are received at the second packet fronthaul interface 730 via the two respective links 760, 770, the two streams are recombined to form a single stream. This recombining operation can be considered to be equivalent to the method steps 430 and 440 as illustrated and described above with reference to FIG. 4. In more detail, the placeholder protocol data unit "4P" in the second stream 800C can be detected and subsequently replaced with the respective protocol data unit in the first stream 800B, i.e. protocol data unit "4", so as to generate an updated receiving-side stream 800C of protocol data units, which is the forwarded via the fourth link 780 to the radio unit 740.

Embodiments of the disclosure thus introduce methods and apparatuses for managing traffic flows over network resources with different processing characteristics and recombine them at different egress points. In more detail, embodiments of the disclosure introduce a mechanism for routing secured and unsecured split traffic that allows allowing aggregation of processing power for specific functions (e.g. MACsec) in few selected points of the network. Hence, resources can be used in a more efficient way. In particular, embodiments of the disclosure allow a pool peak dimensioning instead of interface peak, thus sharing resources over multiple traffic flows.

Compared with currently known mechanisms, embodiments of the disclosure can operate over networks, not only links, splitting and recombining traffic flows from different sources. It can allow sharing of a pool of secured resources among multiple ports and nodes.

The above disclosure sets forth specific details, such as particular embodiments or examples for purposes of explanation and not limitation. It will be appreciated by one skilled in the art that other examples may be employed apart from these specific details.

The invention claimed is:

1. A method at a transmitting unit for managing traffic flow over a network, the method comprising:
   detecting a subset of protocol data units in an original stream of protocol data units to be transmitted over the network, the original stream being associated with a first source port, and the subset of protocol data units comprising one or more protocol data units that require a different amount of processing power compared to other protocol data units in the original stream, detecting the subset of protocol data units being performed in a random manner at one or more time intervals, each of the one or more time intervals having a duration that is compatible with a bit rate supported by a first link of the network;
   generating an updated transmitting-side stream of protocol data units based on the original stream, the updated transmitting-side stream of protocol data units excluding the detected subset;
   merging the subset of protocol data units with a subset of protocol data units associated with a second source port to form a merged stream;
   transmitting the merged stream, as a first stream, over the first link of the network;
   transmitting the updated transmitting-side stream associated with the first source port, as a second stream, over a second link of the network; and
   transmitting an updated transmitting-side stream associated with the second source port, as a third stream, over a third link of the network.

2. The method according to claim 1, further comprising assigning a label to each protocol data unit in the original stream, wherein the label is indicative of an order of the respective protocol data unit in a transmission sequence.

3. The method according to claim 2, wherein generating the updated transmitting-side stream comprises replacing each of the detected subset of protocol data units in the original stream with a placeholder protocol data unit, wherein each placeholder protocol data unit contains information associated with the assigned label of the respectively replaced protocol data unit.

4. The method according to claim 3, wherein each placeholder protocol data unit includes one or more attributes of a respectively replaced protocol data unit in the original stream, wherein the one or more attributes a protocol data unit comprises at least one of: a size of the respective protocol data unit, head information of the respective protocol data unit, and non-security-sensitive content in the respective protocol data unit.

5. The method according to claim 4, wherein detecting the subset of protocol data units comprises determining one or more protocol data units that contain security-sensitive content as the subset of protocol data units.

6. The method according to claim 5, wherein each placeholder protocol data unit includes at least non-security-sensitive content in the respectively replaced protocol data unit in the original stream, and wherein the method further comprises replacing security-sensitive content in each of the placeholder protocol data unit with placeholder data.

7. The method according to claim 2, wherein assigning a label to each protocol data unit in the original stream is performed in a cyclical manner.

8. The method according to claim 2, wherein an assigned label of each protocol data unit in the original stream further contains information associated with the source port of the respective protocol data unit.

9. The method according to claim 2, wherein an assigned label to each protocol data unit in the original stream comprises a number indicative of an order of the respective protocol unit in the transmission sequence.

10. The method according to claim 2, further comprising storing each of the assigned labels for the protocol data units in the original stream in a payload of the respective protocol data unit.

11. The method according claim 1, wherein the first stream, the second stream, and the third stream of protocol data units are transmitted to a receiving unit.

12. The method according to claim 1, wherein detecting the subset of protocol data units comprises determining one or more protocol data units that contain control data as the subset of protocol data units.

13. The method according to claim 1, wherein each protocol data unit is an Ethernet frame or an IP packet.

14. The method according to claim 1, wherein the first link is a secured link, the second link is an unsecured link, and the third link is an unsecured link.

15. The method according to claim 1, wherein the first link, the second link, and the third link of the network are Media Access Control Security, MACsec, enabled or Internet Protocol Security, IPsec, enabled.

16. The method according to claim 1, wherein the network is a fronthaul network.

17. A transmitting unit for managing traffic flow over a network, the transmitting unit comprising processing circuitry and interface circuitry, wherein the processing circuitry is configured to:

detect a subset of protocol data units in an original stream of protocol data units to be transmitted over the network, the original stream being associated with a first source port, and the subset of protocol data units comprising one or more protocol data units that require a different amount of processing power compared to other protocol data units in the original stream, detecting the subset of protocol data units being performed in a random manner at one or more time intervals, each of the one or more time intervals having a duration that is compatible with a bit rate supported by a first link of the network;

generate an updated transmitting-side stream of protocol data units based on the original stream, the updated transmitting-side stream of protocol data units excluding the detected subset; and merge the subset of protocol data units with a subset of protocol data units associated with a second source port to form a merged stream, the interface circuitry being coupled to the processing circuitry and being configured to:

transmit the merged stream, as a first stream, over the first link of the network;

transmit the updated transmitting-side stream associated with the first source port, as a second stream; and transmit an updated transmitting-side stream associated with the second source port, as a third stream, over a third link of the network.

* * * * *